Dec. 8, 1964 P. B. JENSEN 3,159,890
SNAP FASTENER
Filed Oct. 31, 1963
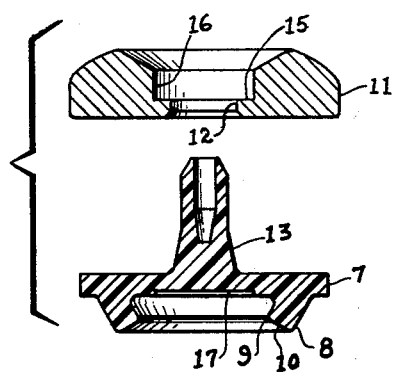
Fig.1.
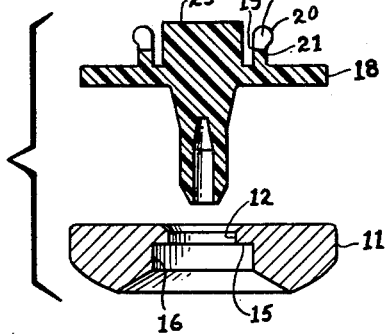
Fig.2.
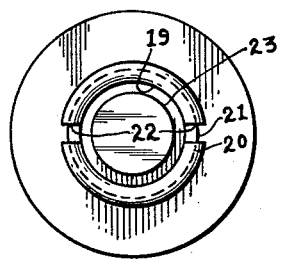
Fig.6.
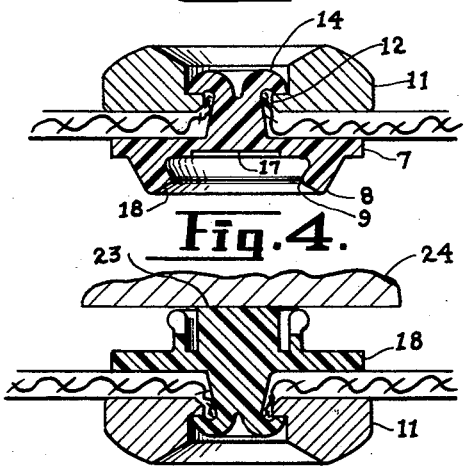
Fig.3.
Fig.4.
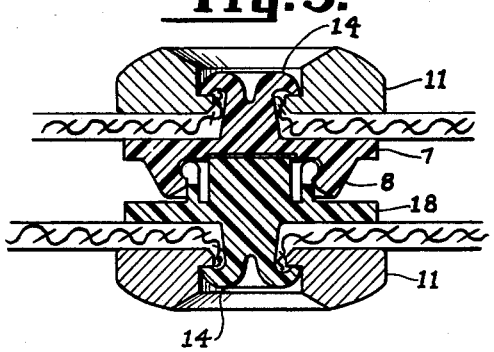
Fig.5.
INVENTOR.
Philip B. Jensen.
BY
H. F. Johnston

# United States Patent Office 3,159,890
Patented Dec. 8, 1964

3,159,890
SNAP FASTENER
Philip B. Jensen, Naugatuck, Conn., assignor to Scovill Manufacturing Company, Waterbury, Conn., a corporation of Connecticut
Filed Oct. 31, 1963, Ser. No. 320,370
4 Claims. (Cl. 24—214)

This improvement is an improvement in a snap fastener of the resilient stud type wherein the stud has an up-standing circular flange which is comparatively thin so that it will be flexible when the stud member is made of molded plastic material.

The object of the invention is to provide adequate means for protecting this comparatively thin flange from injury in laundering operations and particularly, against injury by a pressing iron.

A further object is to provide such protecting means which will be integral with the base of the stud element so that it can be molded in one piece with it.

Other objects and advantages will hereinafter more fully appear.

In the accompanying drawing, I have shown for purposes of illustration, one embodiment which the invention may assume in practice.

In the drawing:

FIG. 1 is a central sectional view of the two parts of a socket element which is suitable for use with my improved stud member;

FIG. 2 is a central section of my improved resilient stud and a member for securing it to a flexible support;

FIG. 3 is a central section showing the socket assembled to a support;

FIG. 4 is a central section showing the stud member assembled to a flexible support;

FIG. 5 is a central section of the complete snap fastener assembly; and

FIG. 6 is a top plan view of the resilient stud.

Although any suitable hollow socket may be employed with my improved snap fastener stud, I have shown it with a plastic socket element having a circular base 7 with a circular flange 8, shaped so as to provide a constricted entrance opening 9 with a lead-in surface 10.

The socket, as well as the stud, may be molded from a suitable plastic material having generally the properties similar to nylon wherein the thicker sections, such as the flange 8, may be described as rigid whereas thinner sections of such sections are flexible. Such a socket element may be attached by means of a washer or plastic eyelet 11 having a central hole 12 to receive a post 13 extending from the base 7 in the opposite direction from that of the flange 8. This post is hollow and is formed over by heat and pressure to provide a rivet head 14 to bear against the shoulder 15 in the plastic eyelet 11, such shoulder 15 being provided by the counterbore 16. The socket member is molded preferably with a depression or recess 17 so as to provide space to accommodate the novel feature of my improved stud element.

The stud member has a circular base 18 adapted to bear against the surface of the supporting material, and attaching means which is similar to that described for the socket element, and in which the same reference numerals are applied to indicate the corresponding parts.

The yielding portion of the stud comprises a circular flange 19 which may be described as an up-standing flange or one which projects upwardly from the base 18. This flange has an annular bead 20 around its upper edge and a constricted neck portion 21. In order to increase the resiliency of this flange, two or more slots 22 may be provided, such slots extending through the bead 20 into the more flexible neck portion 21.

The means for preventing injury to this circular flange 19 and particularly to the bead 20, takes the form of an upstanding solid projection 23 integral with the base 18. This projection is preferably cylindrical in shape, concentric with the flange 19, and spaced away from said flange enough to permit the free flexing of the flange when it is pressed into the opening 9 of the socket 7. This projection 23 is preferably higher than the flange 19 so as to extend upwardly beyond the bead 20 and protect such flange from damage as by the surface of a laundry iron indicated at 24 in FIG. 4.

As seen in the complete snap fastener assembly in FIG. 5, the recess 17 in the socket element will provide space to prevent interference between the projection 23 and the inner surface of the socket. When the socket and stud members are attached in the manner described, the pieces of flexible supporting material 25 will be gripped firmly between the bases of the element and the attaching members 11.

As a result of my invention, it will be observed that the resilient flange of a stud of the kind described is well protected from damage by a simple and inexpensive expedient, requiring only a projection which can be molded in one piece with the stud and which does not add to its bulk or detract from its appearance.

What I claim is:

1. A snap fastener resilient stud consisting of plastic material which is rigid in thicker sections and flexible in thinner sections, said stud having in combination:
    (a) a base adapted to bear against a piece of supporting material;
    (b) an upstanding, inwardly yieldable circular flange projecting from said base; and
    (c) an upstanding solid projection integral with said base and surrounded by said flange, an upward extent of said projection from said base being at least as much as that of said circular flange.

2. A snap fastener resilient stud as defined in claim 1 wherein said solid projection is cylindrical in shape and concentric wtih said circular flange and wherein said flange is spaced slightly from said projection to permit inward flexing of said flange.

3. A snap fastener resilient stud as defined in claim 1 wherein said projection is higher than said flange so as better to protect such flange from damage.

4. A snap fastener assembly having a stud as defined in claim 3, together wtih a socket having a base similar to the base of said stud and a rigid circular flange adapted to have snap engagement around the stud circular flange, and wherein said socket base is provided with a central internal recess to accommodate said solid projection of the stud when the stud and socket are inter-engaged.

References Cited in the file of this patent

UNITED STATES PATENTS

| | | |
|---|---|---|
| 1,756,186 | Fenton | Apr. 29, 1930 |
| 3,049,777 | Lewin | Aug. 21, 1962 |

FOREIGN PATENTS

| | | |
|---|---|---|
| 130,772 | Germany | May 15, 1902 |